(12) United States Patent
Lin

(10) Patent No.: US 8,930,074 B1
(45) Date of Patent: Jan. 6, 2015

(54) APPARATUS OF AUTOMATIC VEHICLE SUSPENSION SYSTEM USING REAL-TIME ROAD CONTOUR

(71) Applicant: National Tsing Hua University, Hsinchu (TW)

(72) Inventor: Youn-Long Lin, Hsinchu (TW)

(73) Assignee: Tional Tsing Hua University, Hsinchu (TW)

( * ) Notice: Subject to any disclaimer, the term of this patent is extended or adjusted under 35 U.S.C. 154(b) by 0 days.

(21) Appl. No.: 14/093,697

(22) Filed: Dec. 2, 2013

(30) Foreign Application Priority Data

Aug. 23, 2013 (TW) .............................. 102130137 A

(51) Int. Cl.
*B60G 17/018* (2006.01)
*B60G 17/0165* (2006.01)
*B60G 17/016* (2006.01)

(52) U.S. Cl.
CPC ...... *B60G 17/0165* (2013.01); *B60G 2800/916* (2013.01); *B60G 17/016* (2013.01)
USPC ............. 701/37; 701/36; 701/29.7; 701/29.1; 340/438; 340/439

(58) Field of Classification Search
CPC .. B60N 2/002; B60G 17/0165; B60G 17/016; B60G 2800/916; B60G 2600/18; B60G 2600/162; B64C 2201/141
USPC .............. 701/36, 37, 38, 29.1, 29.7, 29.2, 96; 340/438, 439, 441
See application file for complete search history.

(56) References Cited

U.S. PATENT DOCUMENTS 4,976,043 A * 12/1990 Bieg ................................. 33/551
6,161,844 A * 12/2000 Charaudeau et al. ...... 280/5.515

* cited by examiner

*Primary Examiner* — Gertrude Arthur Jeanglaude
(74) *Attorney, Agent, or Firm* — Jackson IPG PLLC

(57) ABSTRACT

An apparatus of automatic vehicle suspension system is provided. Road conditions are precisely monitored for reducing vibrations of cabin. Uneven road surface is crossed over through fast expansion and compression of shock absorber just in time. The present invention uses real-time control of an active suspension system to build road contour at real time. At the same time, control signals having better suspension dynamic characteristics are updated at real time for further obtaining a superior and precise suspension system.

5 Claims, 3 Drawing Sheets

APPARATUS OF AUTOMATIC VEHICLE SUSPENSION SYSTEM USING REAL-TIME ROAD CONTOUR

TECHNICAL FIELD OF THE INVENTION

The present invention relates to vehicle suspension control system; more particularly, relates to precisely monitoring road conditions for reducing vibrations of cabin by crossing over road unevenness through fast expansion and compression of shock absorbers just in time, where the present invention uses 3D sensing technology to build road contour at real time; and, at the same time, control signals having better suspension dynamic characteristics are updated at real time for further obtaining a superior and precise suspension system.

DESCRIPTION OF THE RELATED ARTS

There are three kinds of suspension systems, including passive suspension systems, semi-active suspension systems and active suspension systems. Therein, the passive suspension systems operate mechanically and, in general, all vehicles are equipped with passive suspension systems. They use spiral springs, flat springs, torsion springs, air springs or rubber springs to function. The semi-active suspension systems have no extra force to restrain vibrations from uneven road surface, just like the passive suspension systems. Yet, as comparing to the passive suspension systems, the semi-active suspension systems can change their coefficients of damping by sensing the vibration through electronic devices, where the vibrations are effectively reduced and passengers' comfort is enhanced by making the suspension systems stiff or soft. The active suspension systems use new technologies to control vertical wheel movements for absorbing impacts and vibrations from uneven road surface. Sensors are used to detect vehicle's movements and send data to an electrical control unit (ECU). The ECU analyzes the data to control vehicle's movements with the help of the active suspension systems. The ECU is activated through liquid, air or electricity for the active suspension systems to provide comfort and high performance. But, the active suspension systems are expensive and, thus, are only equipped in high-end, luxurious and high-quality cars.

Hence, the prior arts do not fulfill all users' requests on actual use.

SUMMARY OF THE INVENTION

The main purpose of the present invention is to precisely monitor road conditions (e.g. concaves, cracks, projections) for eliminating vibrations of cabin by crossing over road unevenness through fast expansion and compression of shock absorbers just in time.

Another purpose of the present invention is to use 3D sensing technology to build road contour at real time and, at the same time, update control signals having better suspension dynamic characteristics at real time for further obtaining a superior and precise suspension system.

To achieve the above purposes, the present invention is an apparatus of automatic vehicle suspension system using real-time road contour, comprising a 3-dimensional (3D) sensor, a contour builder, a road contour unit, a suspension controller, a vehicle suspension system and a cloud management system, where the 3D sensor is set at front end of a vehicle and has at least an image fetching device to fetch a 3D visual image of road in front; the contour builder is connected with the 3D sensor to receive the 3D visual image sent from the 3D sensor for building a contour of road in front according to real-time dynamic condition information (info) of the vehicle; the real-time dynamic condition info is obtained through a vehicle condition unit; the road contour unit, comprising a contour database and a control database, is connected with the contour builder to receive the contour sent from the contour builder for obtaining road condition info according to the contour and storing the road condition info in the contour database; the suspension controller is connected with the road contour unit to receive the road condition info sent from the road contour unit for obtaining a control signal according to the real-time dynamic condition info obtained by the vehicle condition unit and a real-time control calculation processed by a driving program; the control signal is used to handle the road in front and is sent back to the road contour unit to be stored in the control database; the vehicle suspension system is connected with the suspension controller to receive the control signal read and sent from the control database of the road contour unit by the suspension controller for controlling vertical movement of each wheel to cross over uneven road surface according to the control signal and for obtaining the real-time dynamic condition info; the vehicle condition unit is connected with the vehicle suspension system to receive the real-time dynamic condition info sent from the vehicle suspension system for responding the real-time dynamic condition info by the suspension controller and the contour builder; the cloud management system, comprising a management unit and a cloud database, is connected with the road contour unit and mutually transfers info with the road contour unit; the management unit receives the control signal sent from the control database of the road contour unit before the suspension controller reads data from the control database; and the control signal received is compared with a most similar control signal in the cloud database to obtain a control signal having better suspension dynamic characteristics to be sent back to the control database of the road contour unit. Accordingly, a novel apparatus of automatic vehicle suspension system using real-time road contour is obtained.

BRIEF DESCRIPTIONS OF THE DRAWINGS

The present invention will be better understood from the following detailed description of the preferred embodiment according to the present invention, taken in conjunction with the accompanying drawings, in which FIG. 1 is the perspective view showing the preferred embodiment according to the present invention;

DESCRIPTION OF THE PREFERRED EMBODIMENT

The following description of the preferred embodiment is provided to understand the features and the structures of the present invention.

Figure 1:
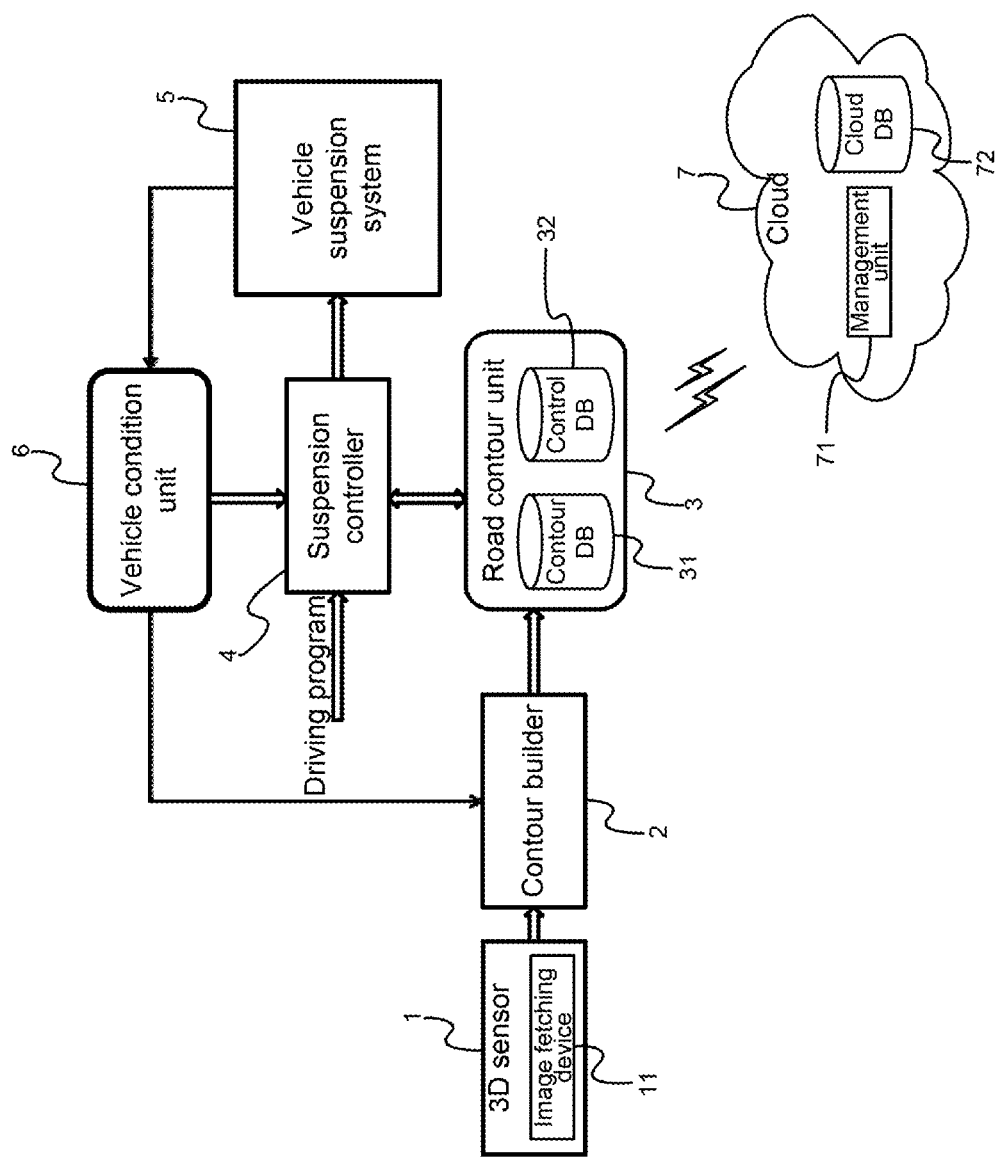
Figure 2:
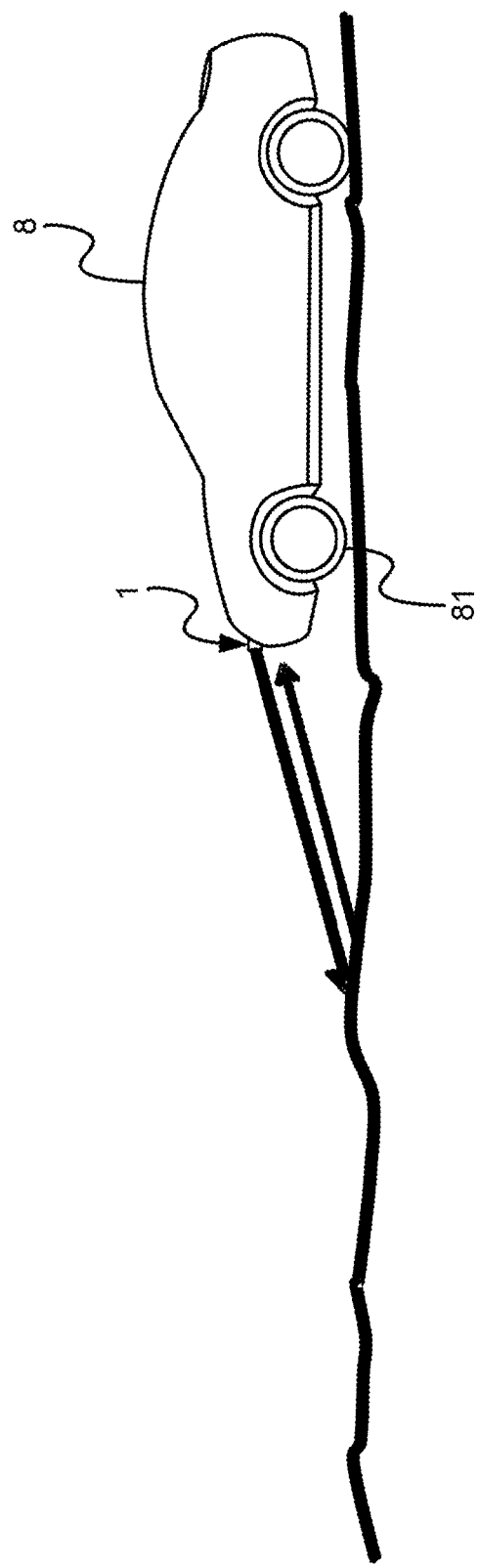
FIG. 2 is the view showing the state of use.
Figure 3:
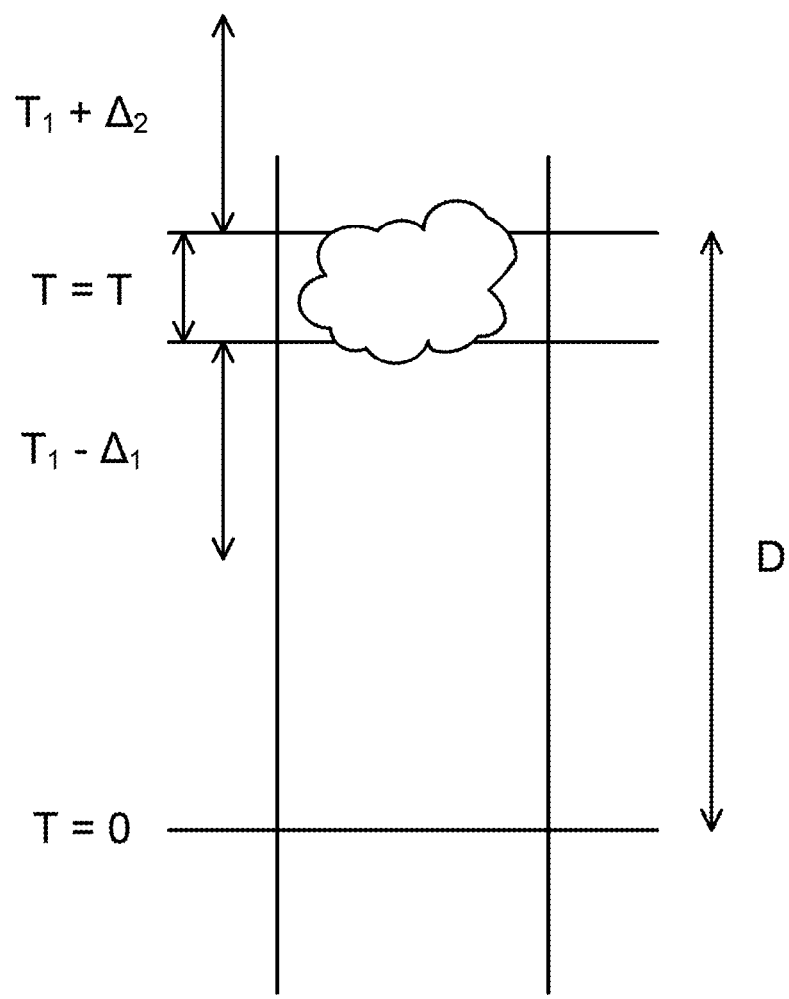
FIG. 3 is the view showing the active real-time suspension control.

Please refer to FIG. 1 to FIG. 3, which are a perspective view showing a preferred embodiment according to the present invention; a view showing a state of use; and a view showing active real-time suspension control. As shown in the figures, the present invention is an apparatus of automatic vehicle suspension system using real-time road contour, comprising a three-dimensional (3D) sensor 1, a contour builder 2, a road contour unit 3, a suspension controller 4, a vehicle suspension system 5, a vehicle condition unit 6 and a cloud management system 7.

The 3D sensor 1 is set at front end of a vehicle 8, which comprises at least an image fetching device 11 for fetching a 3D visual image of road in front.

The contour builder 2 is connected with the 3D sensor 1 to receive the 3D visual image sent from the 3D sensor 1; and, according to real-time dynamic condition information (info) obtained by the vehicle condition unit 6, a contour of the road in front is built.

The road contour unit 3, comprising a contour database 31 and a control database 32, is connected with the contour builder 2 to receive the contour sent from the contour builder 2 and, according to the contour, road condition info of the road in front is generated to be stored in the contour database 31.

The suspension controller 4 is connected with the road contour unit 3 to receive the road condition info sent from the road contour unit 3. According to the real-time dynamic condition info obtained by the vehicle condition unit 6 and a real-time control calculation processed by a driving program, a control signal is obtained to handle the road in front and the control signal is sent back to the road contour unit 3 to be stored in the control database 32. Besides, the suspension controller 4 further calculates vehicle's info of seats, accelerated speed, braking force and turning angle for providing the vehicle suspension system 5 on controlling the seats, the accelerated speed, the braking force and the turning operation.

The vehicle suspension system 5 is connected with the suspension controller 4 to receive the control signal read and sent from the control database 32 of the road contour unit 3 by the suspension controller 4. According to the control signal, the vehicle 8 can control each wheel 81 to move vertically in the mean time for preparing the vehicle 8 to cross over uneven road surface and for generating real-time dynamic condition info of the vehicle 8, including the vehicle's info of seats, accelerated speed, braking force and turning angle.

The vehicle condition unit 6 is connected with the vehicle suspension system 5 to receive the real-time dynamic condition info of the vehicle 8 sent from the vehicle suspension system 5 for responding the real-time dynamic condition info by the suspension controller 4 and the contour builder 2.

The cloud management system 7 is connected and mutually transfers signals with the road contour unit 3 through the Internet. The cloud management system 7, comprises a management unit 71 and a cloud database 72. Before the suspension controller 4 reads data from the control database 32, the management unit 71 receives the control signal sent from the control database 32 of the road contour unit 3 to be compared with a most similar control signal in the cloud database 72 for obtaining a better control signal for the suspension dynamic characteristics to be sent back to the control database 32 of the road contour unit 3. Besides, the cloud management system 7 can fetch road condition info from the contour database 32 of the road contour unit 3 for road maintenance.

Thus, a novel apparatus of automatic vehicle suspension system using real-time road contour is obtained.

For building the road contour in front of the vehicle, the 3D visual image obtained by the 3D sensor 1 is used to find unevenness on the road; and, thus, the suspension controller 4 can generate a signal of active real-time suspension control for the vehicle suspension system 5. In FIG. 3, if unevenness on the road is found in the 3D visual image obtained by the 3D sensor 1, the suspension controller 4 processes the active real-time suspension control with the signal, comprising the following steps:

(a) From a time of $T_1-\Delta 1$, the vehicle suspension system is used to actively control each wheel of the vehicle to move upwardly or downwardly.

(b) From a time of $T_1+\Delta 2$, the vehicle suspension system is used to release the effect of step (a) by moving the wheel downwardly or upwardly.

Therein, $T_1$ is an impact time obtained by dividing a distance between the wheel and a focus of the 3D sensor (DIST) by a speed of the vehicle (SPEED), which can be expressed through a formula as follows: $T_1$=DIST/SPEED.

Thus, the present invention precisely grasps road conditions (e.g. concaves, cracks, projections) for reducing vibrations of cabin by crossing over uneven road surface through fast expansion and compression prepared in advance. The present invention uses real-time control of the active suspension system to build road contour at real time. At the same time, control signals having better suspension dynamic characteristics can be updated at real time for further obtaining a superior and precise suspension system.

To sum up, the present invention is an apparatus of automatic vehicle suspension system using real-time road contour, where road conditions is precisely monitored for eliminating all vibrations of cabin by crossing over uneven road surface through fast expansion and compression prepared in advance; the present invention uses real-time control of an active suspension system to build road contour at real time; and, at the same time, control signals having better suspension dynamic characteristics are updated at real time for further obtaining a superior and precise suspension system.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. An apparatus of automatic vehicle suspension system using real-time road contour, comprising
a 3-dimensional (3D) sensor, said 3D sensor being located at an end of a vehicle, said 3D sensor having at least an image fetching device, said image fetching device obtaining a 3D visual image of road in front of said end of said vehicle;
a contour builder, said contour builder being connected with said 3D sensor, said contour builder receiving said 3D visual image sent from said 3D sensor,
wherein, according to real-time dynamic condition information (info) of said vehicle, said contour builder obtains a contour of road in front of said end of said vehicle; and
wherein said real-time dynamic condition info is obtained through a vehicle condition unit;
a road contour unit, said road contour unit being connected with said contour builder, said road contour unit comprising a contour database and a control database, said road contour unit receiving said contour sent from said contour builder,
wherein, according to said contour, said road contour unit obtains road condition info to be stored in said contour database;
a suspension controller, said suspension controller being connected with said road contour unit, said suspension controller receiving said road condition info sent from said road contour unit, wherein, according to said real-time dynamic condition info obtained by said vehicle condition unit and a real-time control calculation processed by a driving program, a control signal is obtained to handle said road in front of said end of said vehicle and said control signal is sent back to said road contour unit to be stored in said control database;

a vehicle suspension system, said vehicle suspension system being connected with said suspension controller, said vehicle suspension system receiving said control signal read and sent from said control database of said road contour unit by said suspension controller, wherein, according to said control signal, vertical movement of each wheel is controlled to cross over uneven road surface and said real-time dynamic condition info is obtained by said vehicle suspension system; and wherein said vehicle condition unit is connected with said vehicle suspension system to receive said real-time dynamic condition info sent from said vehicle suspension system to respond said real-time dynamic condition info by said suspension controller and said contour builder; and a cloud management system, said cloud management system being connected and mutually transferring info with said road contour unit, said cloud management system comprising a management unit and a cloud database, wherein said management unit receives said control signal sent from said control database of said road contour unit before said suspension controller reads data from said control database; and said control signal received is compared with a most similar control signal in said cloud database to obtain a control signal having better suspension dynamic characteristics to be sent back to said control database of said road contour unit.

2. The device according to claim 1,
wherein said real-time dynamic condition info comprises said vehicle's info of seats, accelerated speed, braking force and turning angle.

3. The device according to claim 1,
wherein said cloud management system obtains said road condition info in said contour database of said road contour unit to maintain road.

4. The device according to claim 1,
wherein said 3D visual image of said 3D sensor is obtained to generate signals of active real-time suspension control by said suspension controller for said vehicle suspension system according to unevenness on road in front of said end of said vehicle.

5. The device according to claim 4,
wherein, on finding unevenness on road in front of said end of said vehicle in said 3D visual image obtained by said 3D sensor, said suspension controller uses said control signal to process said active real-time suspension control, comprising steps of:
  (a) from a time of $T_1-\Delta1$, using said vehicle suspension system to actively control each wheel of said vehicle to vertically move said wheel at a first direction; and
  (b) from a time of $T_1+\Delta2$, using said vehicle suspension system to release effect of step (a) by vertically moving said wheel at a second direction opposite to said first direction,
wherein $T_1$ is an impact time obtained by dividing a distance (DIST) by a speed (SPEED); said distance is a distance between said wheel and a focus of said 3D sensor; said speed is a speed of said vehicle; and $T_1$ is thus obtained through a formula as follows: $T_1=DIST/SPEED$.

* * * * *

UNITED STATES PATENT AND TRADEMARK OFFICE
CERTIFICATE OF CORRECTION

| | | |
|---|---|---|
| PATENT NO. | : 8,930,074 B1 | Page 1 of 1 |
| APPLICATION NO. | : 14/093697 | |
| DATED | : January 6, 2015 | |
| INVENTOR(S) | : Youn-Long Lin | |

It is certified that error appears in the above-identified patent and that said Letters Patent is hereby corrected as shown below:

On the title page item (73), Assignee should be listed as:

--Assignees: (1) NATIONAL TSING HUA UNIVERSITY, of Hsinchu City, Taiwan--

Signed and Sealed this
Nineteenth Day of May, 2015

Michelle K. Lee
*Director of the United States Patent and Trademark Office*